United States Patent [19]
Bianco et al.

[11] Patent Number: 5,394,234
[45] Date of Patent: Feb. 28, 1995

[54] METHOD AND APPARATUS FOR DETECTING FORGED DIFFRACTION GRATINGS ON IDENTIFICATION MEANS

[75] Inventors: James S. Bianco, Enfield, Conn.; David J. Horan, Westfield, Mass.

[73] Assignee: Control Module Inc., Enfield, Conn.

[21] Appl. No.: 42,651

[22] Filed: Apr. 5, 1993

Related U.S. Application Data

[63] Continuation-in-part of Ser. No. 921,460, Jul. 28, 1992, abandoned, which is a continuation-in-part of Ser. No. 857,729, Mar. 26, 1992, abandoned, which is a continuation-in-part of Ser. No. 810,483, Dec. 19, 1991, abandoned.

[51] Int. Cl.⁶ ............................................. G06K 7/10
[52] U.S. Cl. ..................................... 356/71; 235/454
[58] Field of Search ................... 356/71; 235/454, 457

[56] References Cited

U.S. PATENT DOCUMENTS

| | | | |
|---|---|---|---|
| 4,023,010 | 5/1977 | Horst et al. | 356/331 |
| 4,211,918 | 7/1980 | Nyfeler et al. | 235/454 |
| 4,501,439 | 2/1985 | Antes | 356/71 |
| 4,544,266 | 10/1985 | Antes | 356/71 |
| 4,641,017 | 2/1987 | Lopata | 235/457 |
| 5,200,794 | 4/1993 | Nishiguma et al. | 356/71 |

*Primary Examiner*—Richard A. Rosenberger
*Attorney, Agent, or Firm*—John H. Crozier

[57] ABSTRACT

In a preferred embodiment, a method of of of determining if a compound diffraction grating has been forged, the compound diffraction grating including a plurality of diffraction grating elements of different types, the compound diffraction grating being read by serially detecting light diffracted by the diffraction grating elements, including: determining the amplitude of diffracted light signals as the compound diffraction grating is being read; and determining that the compound diffraction grating is forged if the amplitude is below a selected threshold level. In another aspect of the invention, there is provided a method determining if such a diffraction grating has been forged, the method including: measuring the number of transitions between diffraction grating elements across the strip; and comparing the number with a pre-recorded number of the transitions and determining that the diffraction grating strip has been forged if the numbers are not the same. In a further aspect of the invention there is provided a method of determining if a compound diffraction grating has been forged, the method including: illuminating the compound diffraction grating with a beam of light substantially orthogonal to the compound diffraction grating; and determining that the compound diffraction grating has been forged when the beam of light is reflected substantially orthogonally from the compound grating.

1 Claim, 3 Drawing Sheets

METHOD AND APPARATUS FOR DETECTING FORGED DIFFRACTION GRATINGS ON IDENTIFICATION MEANS

CROSS-REFERENCE TO RELATED APPLICATIONS

The present application is a continuation-in-part of U.S. application Ser. No. 07/921,460, filed Jul. 28, 1992, titled SECURE OPTOMAGNETIC IDENTIFICATION, now abandoned, which is a continuation-in-part of U.S. application Ser. No. 07/857,729, filed Mar. 26, 1992, abandoned, which is a continuation-in-part of U.S. application Ser. No. 07/810,483, filed Dec. 19, 1991, abandoned.

BACKGROUND OF THE INVENTION

1. Field of the Invention

The present invention relates generally to identification means having diffraction gratings disposed thereon provided for security and authentication and, more particularly, but not by way of limitation, to novel method and apparatus for determining if such a diffraction grating has been forged.

2. Background Art

In the parents of the present application, and particularly in Ser. No. 07/921,460, there is described method and apparatus for reading a compound diffraction grating and an associated magnetic strip. Such optical images and magnetic strips are provided on identification means, such as credit cards, to assist in authentication of the identification means and to prevent or deter forgery of such identification means.

Some diffraction gratings which may be employed comprise a plurality of different individual gratings of varying widths. Such compound diffraction gratings are expensive to copy and, since credit cards, for example, typically have low maximum charge limits, it is uneconomical to incur the expense of copying one. It is also expensive to build a forged compound diffraction grating from individual diffraction grating elements, since it is extremely difficult to insert grating elements of the necessary precise widths.

The possibility exists, however, that a forger might create a master grating having closely spaced grating elements of the type used in the compound diffraction grating. The forger would then create individual sections of the compound diffraction grating by obliterating all but the type of diffraction grating element desired for each particular section. The obliteration could be by laser and the process could be automated and relatively inexpensive.

Accordingly, it is a principal object of the present invention to provide method and apparatus for detecting when diffraction gratings on identification means have been forged.

It is a further object of the invention to provide such method and apparatus that are easily and economically employed and may be employed while the identification means is being authenticated.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of of determining if a compound diffraction grating has been forged, said compound diffraction grating including a plurality of diffraction grating elements of different types, said compound diffraction grating being read by serially detecting light diffracted by said diffraction grating elements, said method comprising: determining the amplitude of diffracted light signals as said compound diffraction grating is being read; and determining that said compound diffraction grating is forged if said amplitude is below a selected threshold level. In another aspect of the invention, there is provided a method determining if such a diffraction grating has been forged, comprising: measuring the number of transitions between diffraction grating elements across said strip; and comparing said number with a pre-recorded number of said transitions and determining that said diffraction grating strip has been forged if said numbers are not the same. In a further aspect of the invention there is provided a method of determining if a compound diffraction grating has been forged, comprising: illuminating said compound diffraction grating with a beam of light substantially orthogonal to said compound diffraction grating; and determining that said compound diffraction grating has been forged when said beam of light is reflected substantially orthogonally from said compound grating.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
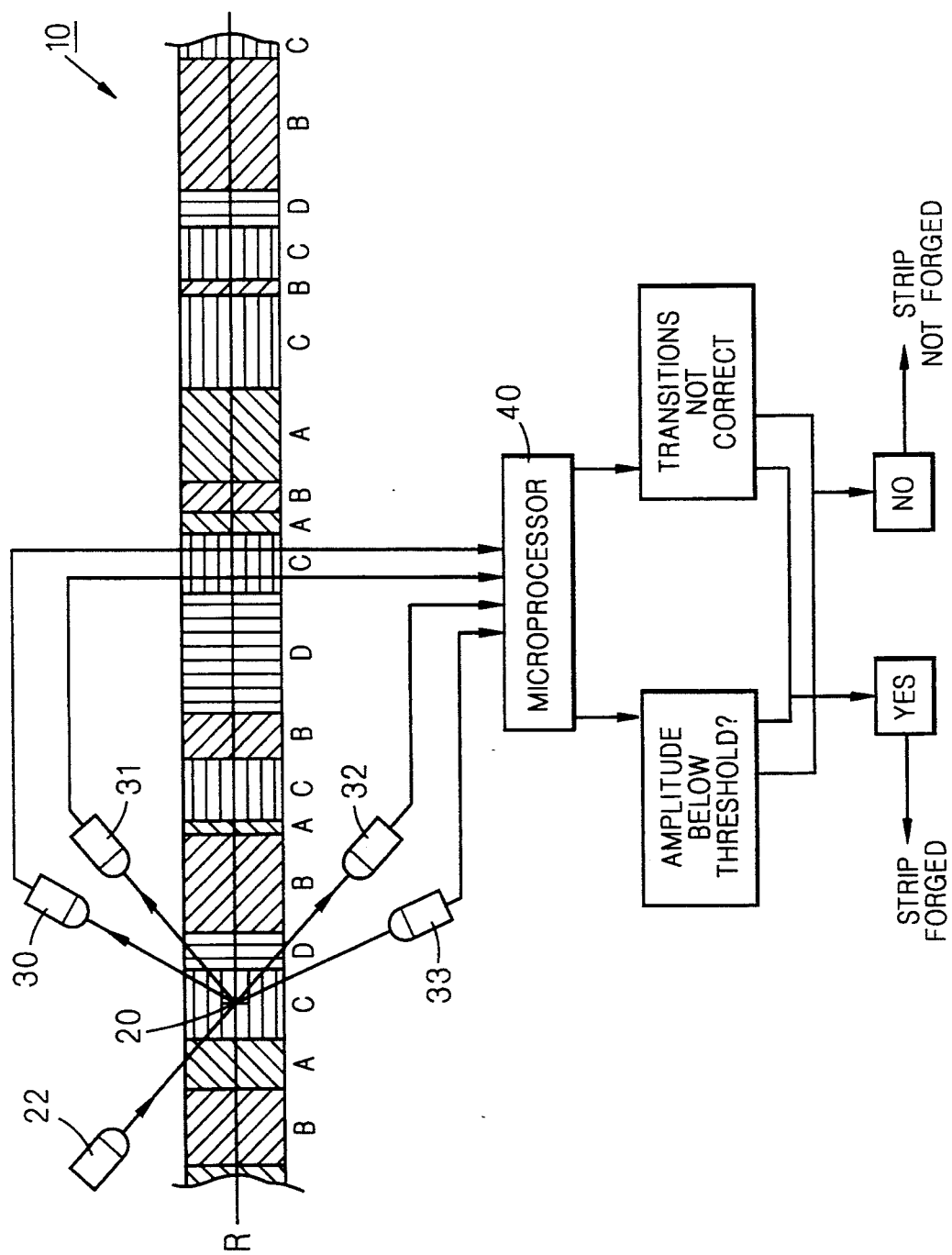
FIG. 1 illustrates schematically a portion of a compound diffraction grating strip and the method and apparatus of the present invention for determining if the diffraction grating has been forged.

Reference should now be made to the drawings figures and particularly to FIG. 1 whereon is illustrated, inter alia, a compound diffracting grating strip, generally indicated by the reference numeral 10. Strip 10 comprises a series of individual grating elements A, B, C, and D having varying widths disposed side by side along strip 10. Strip 10 may be superjacent a magnetic strip (not shown), as is described in the above-referenced patent applications, and may be disposed on a credit card (not shown), for example.

Strip 10 is shown in the process of being optically read. Here, a reading spot 20 lying on a read line "R", along which read line the reading spot moves, is shown as being illuminated by a light source 22. Four photodetectors 30–33 are disposed so as to detect light diffracted by strip 10, each of which photodetectors providing an output indicating the presence of one of grating element types A, B, C, and D. As shown, a type C grating element is being illuminated by light source 22 and one of photodetectors 30–33 will provide an output to a microprocessor 40 indicating the presence of a type C grating element.

The foregoing elements are shown for illustrative purposes only and compound diffraction grating strip 10 may have a fewer or greater number of diffraction grating element types and/or separate light sources may be employed for each of photodetectors 30–33.

Figure 2:
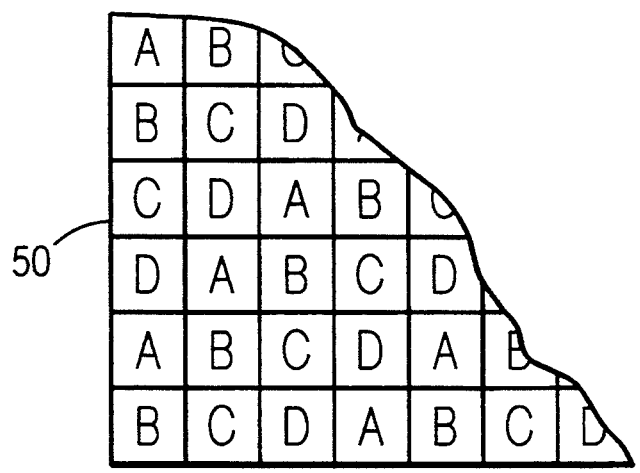
FIG. 2 is a greatly enlarged, fragmentary, top plan view of a master grating for use in forging the diffraction grating of FIG. 1.

FIG. 2 illustrates a master diffraction grating that a forger might employ to simulate grating 10 (FIG. 1), the master diffraction grating being generally indicated by the reference numeral 50. Master diffraction grating 50 comprises a uniform matrix of vertically and horizontally closely spaced bits of diffraction grating elements A, B, C, and D.

Figure 3:
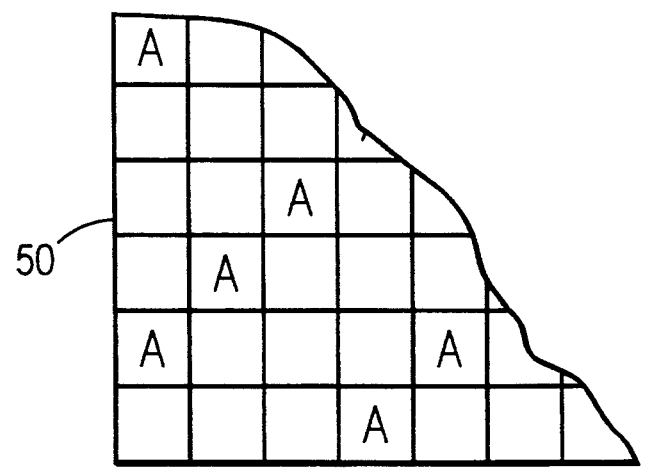
FIG. 3 is the master grating of FIG. 2 with portions thereof obliterated to produce one type of diffraction grating element.

In order to simulate one type of diffraction grating element type, say, a type A grating element, one could employ a laser to obliterate all type B, C, and D diffraction grating elements which would result in the portion of master diffraction grating 50 shown on FIG. 3. The obliteration of diffraction grating elements B, C, and D would continue until the desired length of type A diffraction grating element were obtained. Then, if, for example, the next diffraction grating element were a type C grating element, diffraction grating elements A, B, and D would be obliterated for another desired length, and so forth. The obliteration process would continue until an entire compound diffraction grating strip were produced. The process would be relatively inexpensive and could easily be automated.

The individual diffraction grating elements A, B, C, and D of master diffraction grating 50 could, instead of squares as shown, be in the form of dots or horizontal strips.

Although the above process produces a compound diffraction grating strip having individual grating elements of the proper type, width, and placement, it will be understood that the strength of the diffracted light would, in the present case, be only 25 percent of the strength of light diffracted by a non-forged diffraction grating strip. It is thus possible to determine if a strip has been forged by determining if the amplitude of the diffracted light signal is substantially less than some threshold level. For the present case, this level could be set in the vicinity of 25 percent. If only three grating types were employed, the threshold would be set in the vicinity of 33 percent, and so forth.

Referring again to FIG. 1, the logic employed by microprocessor 40 for determining if strip 10 has not been forged or has been forged is illustrated as described above.

Determination that a strip has been forged will be made only if a low amplitude exists across an entire strip, since automatic gain control will normally be employed to bring up the amplitude when low amplitude is detected for only a small portion of the strip. This allows for the presence of smudges, scratches, or other localized effects on the strip.

In the above-referenced application Ser. No. 07/921,460, there is described encoding, in the magnetic strip on the identification means, relative position information of the visual image and a clock in the magnetic strip. Because of limited storage capacity of the magnetic strip, only a portion of the position of the optical image may be encoded therein. There exists the possibility, then, that a forger might forge that portion, but the remainder of the visual image may not be accurately forged. As a convenient check on this possibility, another aspect of the invention, indicated on FIG. 1, is to count the number of optical transitions between individual grating element types A, B, C, and D and encode this single number in the magnetic strip. Then, when the card is being read for authentication, the number of transitions is determined and compared with the stored number. If the numbers do not match, then the card is forged.

Figure 4:
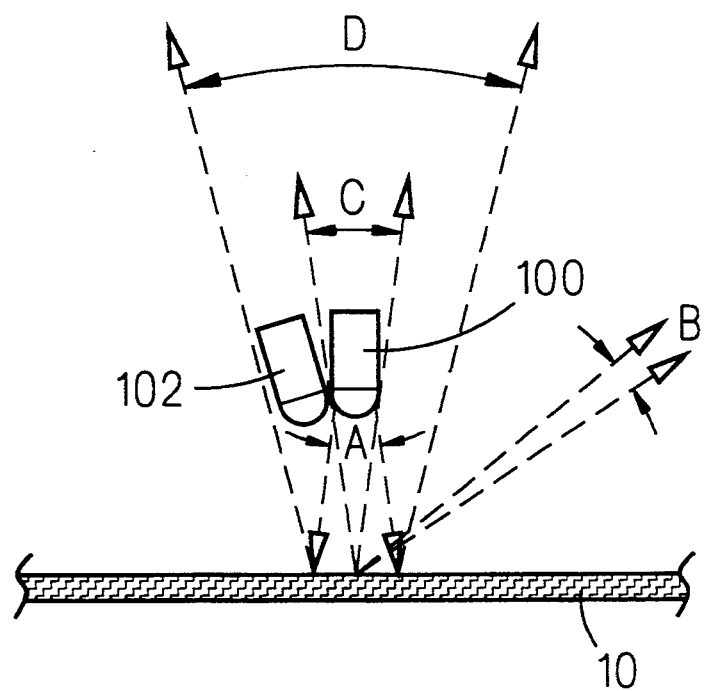
FIG. 4 is a side elevational view of a diffraction grating strip illustrating a method of determining forgery thereof.

FIG. 4 illustrates another technique for determining if a diffraction grating has been altered in the manner described above with reference to FIG. 3. Here, a light source 101 and a photodetector 102 are disposed over diffraction grating strip 10. Normally, a light beam "A" from light source 100 will strike diffraction grating strip 10 which will diffract a beam "B" and also will reflect a narrow beam "C". However, if diffraction grating strip 10 has been forged as described above with reference to FIG. 3, the diffraction grating elements will be altered and light from light source 100 will be substantially entirely reflected in a relatively broad beam "D" which can be detected by photodetector 102 disposed in the envelope of beam "D" outside the envelope of beam "C". Therefore, whenever photodetector 102 outputs a signal, it indicates that diffraction grating strip 10 has been forged.

Light source 100 and photodetector 102 may, of course, be provided in addition to other reading elements (FIG. 1).

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of determining if a compound diffraction grating has been forged, said compound diffraction grating strip including a plurality of diffraction grating elements of different types, said compound diffraction grating strip being read by serially detecting light diffracted by said diffraction grating elements, said method comprising:
    (a) measuring the number of transitions between diffraction grating elements across said strip; and
    (b) comparing said number with a pre-recorded number of said transitions and determining that said diffraction grating strip has been forged if said numbers are not the same.

* * * * *